United States Patent [19]

Chin et al.

[11] Patent Number: 4,917,747
[45] Date of Patent: Apr. 17, 1990

[54] METHOD OF MAKING CRUSHED CORE MOLDED PANELS

[75] Inventors: Victor C. Chin, Issaquah; Paul Y. Jone, Seattle; Robert J. Marshall, Marysville, all of Wash.

[73] Assignee: The Boeing Company, Seattle, Wash.

[21] Appl. No.: 315,725

[22] Filed: Feb. 24, 1989

[51] Int. Cl.⁴ .................. B32B 31/12; B32B 31/20
[52] U.S. Cl. .................. 156/198; 156/211; 156/258; 156/304.5; 428/60; 428/116; 428/117; 428/314.2; 428/316.6
[58] Field of Search ............ 428/117, 116, 60, 118, 428/314.2, 316.6; 156/211, 304.5, 258, 198, 196; 52/309.9, 309.11

[56] References Cited

U.S. PATENT DOCUMENTS

| | | |
|---|---|---|
| 1,763,653 | 6/1930 | Harvey et al. |
| 2,082,047 | 6/1937 | Bronson |
| 2,216,999 | 10/1940 | Bacon ................ 139/153 |
| 2,553,227 | 5/1951 | Wesner ............ 156/304.5 X |
| 2,602,764 | 7/1952 | Billingham |
| 2,704,587 | 3/1955 | Pajak ................ 428/118 |
| 2,860,740 | 11/1958 | Holland et al. ........ 156/258 X |
| 3,249,659 | 5/1966 | Voelker ............ 428/117 X |
| 3,301,732 | 1/1967 | Kunz ................ 156/304 |
| 3,661,669 | 5/1972 | Cairns ................ 156/157 |
| 3,686,061 | 8/1972 | Brown et al. ........ 156/258 X |
| 3,890,108 | 6/1975 | Welsh ................ 428/116 X |
| 3,928,691 | 12/1975 | Knudson ............ 428/53 |
| 4,003,776 | 1/1977 | Barnes ................ 156/242 |
| 4,315,050 | 2/1982 | Rourke ................ 428/116 |
| 4,489,115 | 12/1984 | Layman et al. ........ 428/62 |
| 4,539,064 | 9/1985 | Andruchiw et al. ........ 156/379.7 |
| 4,797,312 | 1/1989 | Sherwood ............ 428/117 |

FOREIGN PATENT DOCUMENTS

| | | |
|---|---|---|
| 1208624 | 2/1960 | France |
| 2425009 | 11/1979 | France |
| 54-72259 | 6/1979 | Japan |
| 305643 | 5/1955 | Switzerland |

Primary Examiner—Robert A. Dawson
Assistant Examiner—Michele K. Yoder
Attorney, Agent, or Firm—Joan H. Pauly

[57] ABSTRACT

A laterally projecting flange (18) is formed on the upper portion of an edge of a flat section (12) of foam core material. The inner surface of the flange (18) and the adjacent lower edge surface of the foam section (12) are positioned adjacent to the upper surface and flat edge surface of a honeycomb core section (14). Hot melt adhesive is applied to hold the sections (12, 14) in this abutting position. The abutting sections (12, 14) are assembled together with upper and lower skins (24, 26) of fiber reinforced resin/matrix composite material pre-preg fabric or tape. The assembly of core sections (12, 14) and skins (24, 26) is positioned in compression molding apparatus and subjected to a crushed core compression molding procedure. During the molding, a bend (32) is formed in the panel assembly substantially along the abutting edges of the core sections (12, 14). The flange (18) is positioned on the outer radius of the bend (32). During the molding, the portion (34) of the honeycomb section (14) radially adjacent to the flange (18) is crushed to form a voidless interface between the sections (12, 14).

15 Claims, 2 Drawing Sheets

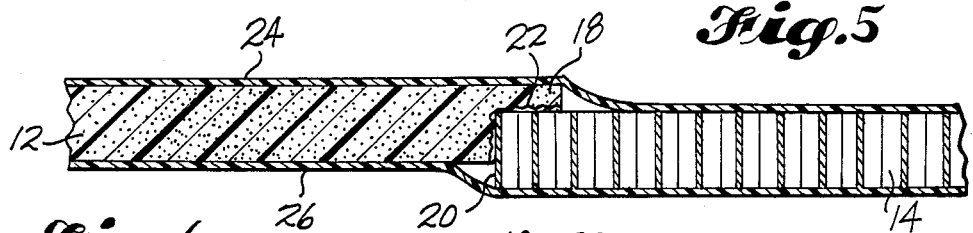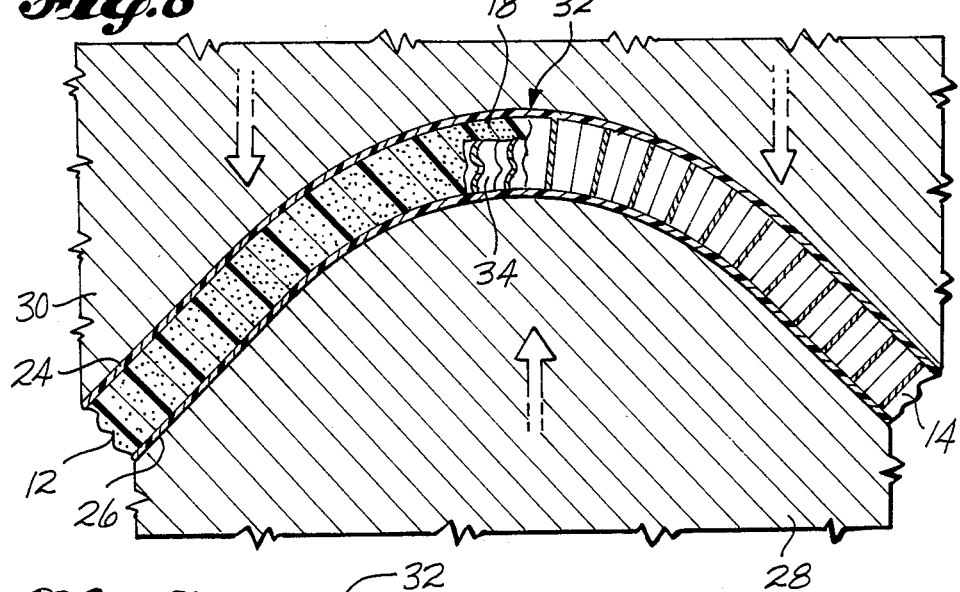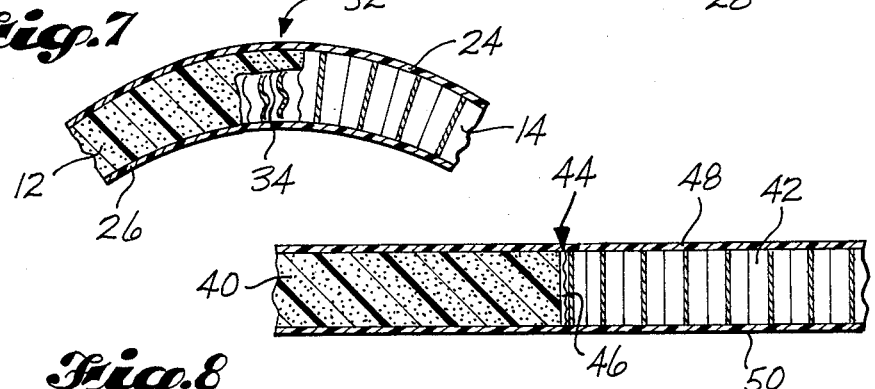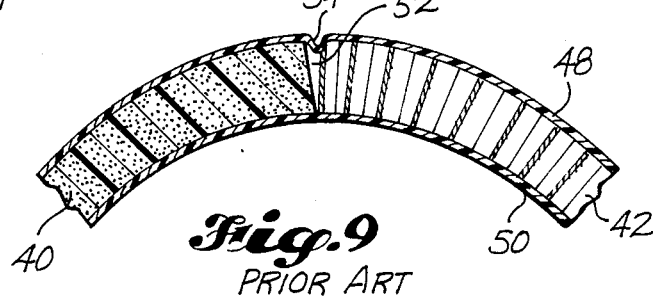

METHOD OF MAKING CRUSHED CORE MOLDED PANELS

TECHNICAL FIELD

This invention relates to methods for making crushed core molded panels and, more particularly, to such a method in which two core materials of differential compressibility are joined at an interface along a radius of the panel, and a reduced thickness edge portion of one of the materials is positioned to extend along the upper surface of the other material prior to molding to prevent separation of the two materials at their interface.

BACKGROUND ART

In the aircraft industry, sandwich panels of a type having a low density core sandwich between two outer skins are widely used. One such type of panel is a crushed core sandwich panel in which the core and skins are compression molded and cured following their assembly. During the compression molding, heat is applied to cure the panel components, and the core is crushed a slight amount just sufficient to ensure that the skins are bonded to the core and have smooth outer surfaces in the finished panel. When these panels are used in areas visible to airplane passengers, the finished appearance of the panel is very important. Therefore, it is desirable to provide the finished panels with a decorative coating or covering to enhance their aesthetic appearance. When the core of the panel is a material such as honeycomb, the covered or coated edges of the panel have a rough uneven appearance if the honeycomb extends all the way to the edges. To avoid this uneven appearance, the edge portions of the core of the panels are desirable formed by a relatively homogeneous material like foam, instead of honeycomb.

In panels that are flat or only have bends with relatively large radii of curvature, the compression molding process results in an acceptable interface between the foam edge portions and the main honeycomb portion of the core. The interface is sufficiently gap-free to produce a panel with an outer skin surface that is sufficiently smooth to produce an aesthetically pleasing appearance in the finished covered panel. However, a problem has arisen in connection with panels having relatively sharp bends at or near the interface. In such panels, during the compression molding procedure, gaps form between the honeycomb core material and the foam core material. These gaps result in irregularities in the molded skin, such as depressions extending along the foam-honeycomb interface. Such depressions are visible following the final coating procedure and, thus, mar the aesthetic appearance of the finished panel. The marred appearance is unacceptable for use in an interior cabin where the panel is visible to passengers. In addition, the separation of the core materials along the interface has a detrimental effect on the structural integrity of the panel.

Another problem that is encountered in the compression molding of sandwich panels having dissimilar core materials is a phenomenon referred to as "markoff". This phenomenon is a result of differential coefficients of thermal expansion of the core materials. The differential causes greater expansion of one material than the other as a result of the elevated temperature to which the panel is subjected during the molding and curing process. The differential expansion in turn results in greater thickness of one core material than the other and a consequent bump along the outer surface of the finished panel adjacent to the interface of the core materials. The phenomenon of markoff can occur regardless of the relative flatness or degree of curvature of the panel along the interface. The effect of the bump on the aesthetic appearance of the finished panel is considered unacceptable by commercial aircraft users.

In order to make the appearance of crushed core sandwich panels acceptable to its customers, the assignee of the applicants has used a hand finishing procedure to eliminate irregularities in the outer skin of the panels, caused by separation of core materials and markoff, before applying the finishing coating or covering to the panel. The process for eliminating depressions along gaps involves cutting the skin along the gap, filling the gap with a potting compound, and sanding the potting compound. This process is very labor intensive and, therefore, very expensive. The procedure for reducing markoff involves the application of doubler plies (extra strips) of skin material. This procedure involves additional labor but is not as labor intensive as the use of potting compound to fill gaps. However, doubler plies by themselves will not bridge in an acceptable manner gaps created by separation of the core materials.

The patent literature includes a number of examples of joints between abutting members. Lap joints in which complementary flanges are overlapped and secured together are disclosed in U.S. Pat. Nos. 4,489,115, grated Dec. 18, 1984, to B. W. Layman et al., and 4,539,064, granted Sept. 3, 1985, to R. Andruchiw et al.; and Japanese Patent Document No. 54-72259, dated June 9, 1979, in the name of Mitsui Mokuzai Kogy. Swiss Pat. No. 305,643, published May 2, 1955, and French Pat. No. 1,208 624, published Feb. 24, 1960, also apparently disclosed lap joints. U.S. Pat. No. 4,003,776, granted Jan. 18, 1977, to R. D. Barnes, discloses a method for forming a demountable overlapping joint in a fiberglass fishing rod.

Joints between abutting members which utilize an intermediate connecting member are disclosed in U.S. Pat. Nos. 3,301,732, granted Jan. 31, 1967, to B. P. Kunz, and 3,661,669, granted May 9, 1972, to J. N. Cairns; and French Patent Specification Publication No. 2,425,009, opened to the public on November 30, 1979. Kunz discloses a joint for sandwich panels in which flat edges of the panel sections are aligned and bonded to a jointer member. The joint is finished with cover strips. Cairns discloses a method of joining pieces of foam backed carpet in which the foam on each abutting edge is compressed to form a flange, and an insert is glued in the recess formed by the compression of the foam. The French document discloses a sandwich panel joint in which the core material is set back from the abutting edges of the skins and a core insert is positioned in the groove formed by the gap between the cores.

U.S. Pat. No. 4,325,050, granted Feb. 9, 1982, to R. Rourke, discloses a method of bonding a sheet of thermoformable plastic to a core of expanded thermoplastic material in which the heated members are pressed together to squeeze material from the sheet into voids in the core. U.S. Pat. No. 2,216,999, granted Oct. 8, 1940, to H. M. Bacon, discloses a U-shaped lug strap for use in looms. To obtain uniform strength at the bend in the U-shape, the strap is provided with a cushion at the bend or is corrugated at the bend and reinforced by a U-shaped filler. U.S. Pat. Nos. 2,602,764, granted July 8, 1952, to M. C. J. Billingham, and 3,928,691, granted Dec. 23, 1975, to R. A. Knudson, disclose structures in which abutting complementary members enclose a tubular member. Knudson discloses a reinforced panel in which the complementary members form a polyurethane core and enclose reinforcing rods, and the outer surfaces of the complementary members are covered with several plies of sheet material.

U.S. Pat. Nos. 1,763,653, granted June 17, 1930, to H. C. Harvey et al., and 2,082,047, granted June 1, 1937, to B. Bronson, disclose flat articles having distinct margin areas. Harvey et al. disclose a resin coated pulp board in which one of two adhesively joined sheets has a lesser circumference and is surrounded by a strengthening bead of molding compound. Bronson discloses a vehicle floor mat having a flattened edge formed by, for example, impregnating and compressing the pad on the undersurface of the mat.

The above patents and the prior art that is discussed and/or cited therein should be studied for the purpose of putting the present invention into proper perspective relative to the prior art.

DISCLOSURE OF THE INVENTION

The subject of the invention is a method of making panels of the type having a low density core sandwiched between outer skins and an interface between two different core materials along a radius of the panel. According to an aspect of the invention, the method comprises providing a substantially flat section of each of the core materials and forming a flange that extends integrally outwardly from an upper portion of one of the sections and forms a reduced thickness edge on said one section. The flanged section is positioned to abut an edge of the other section with the flange extending over the upper surface of the other section. The abutting sections and two skins are assembled, with the assembly including positioning the abutting sections between the skins. The assembled sections and skins are compression molded to form a panel with a bend substantially along the abutting edges of the sections. The bend increases in radius of curvature from the lower to the upper surfaces of the sections. While the sections and skins are being molded, at least one of the flange and the radially adjacent portion of the other section are crushed to form an essentially voidless interface between the sections sandwiched between essentially smooth portions of the skins.

Various core materials may be used in the panel of the invention. For example, the core materials may comprise a low density foam and a honeycomb material. Preferably, one of the sections has a density greater than the other section, and the flange is formed on the section with the greater density. When the core materials comprise a low density foam and a honeycomb material, the flange is preferably formed on the foam. The formation of the flange on the denser core material prevents the flange from being excessively crushed during the molding operation and, thereby, helps ensure a high quality voidless interface between the core materials. When the flange is formed on a foam core material, the step of forming the flange preferably comprises machining the foam.

A preferred feature of the invention is including in the step of positioning the sections to abut each other the application of an adhesive between the sections to maintain them in an abutting relation. This preferred feature ensures that the sections remain in proper position during the assembly of the panel and the initial stages of the molding procedure.

The invention was developed primarily for use in connection with the fabrication of crushed core sandwich panels. According to an aspect of the invention, the step of compression molding sections and skins comprises allowing substantially the entire extent of each section to be crushed an amount sufficient to ensure bonding of the skins to the sections and to produce substantially smooth outer skin surfaces.

The method of the invention solves the problem discussed above of separation of dissimilar core materials which meet at or near a radius of a panel. The method of the invention also prevents the phenomenon of markoff at the interface of the core materials at or near the radius. The result is a structurally sound essentially gap-free interface between the core materials and a smooth outer surface of each of the skins. This in turn results in a panel with a pleasing smooth appearance following the application of a finishing covering to the panel.

The method of the invention accomplishes this desirable result of a structurally sound aesthetically pleasing panel in a cost effective manner. The method of the invention greatly reduces the amount of labor and time required to produce an acceptable panel. The method of the invention is also relatively easy to carry out and does not require complex and/or specialized equipment.

The above-discussed and other advantages and features will become apparent from the detailed description of the best mode for carrying out the invention that follows.

BRIEF DESCRIPTION OF THE DRAWINGS

In the drawings, like element designations refer to like parts throughout, and:

FIG. 5 is like FIG. 4 except that it shows the abutting core sections assembled together with upper and lower skins.

FIG. 6 is a sectional view of the assembled elements during the compression molding procedure.

FIG. 7 is a sectional view of the bend portion of the finished panel.

FIGS. 8 and 9 are sectional views illustrating the problem of separation of the different core materials when they meet at a flat interface. FIG. 8 shows the panel before the molding procedure. FIG. 9 shows the panel following the molding procedure.

BEST MODE FOR CARRYING OUT THE INVENTION

Figure 1:
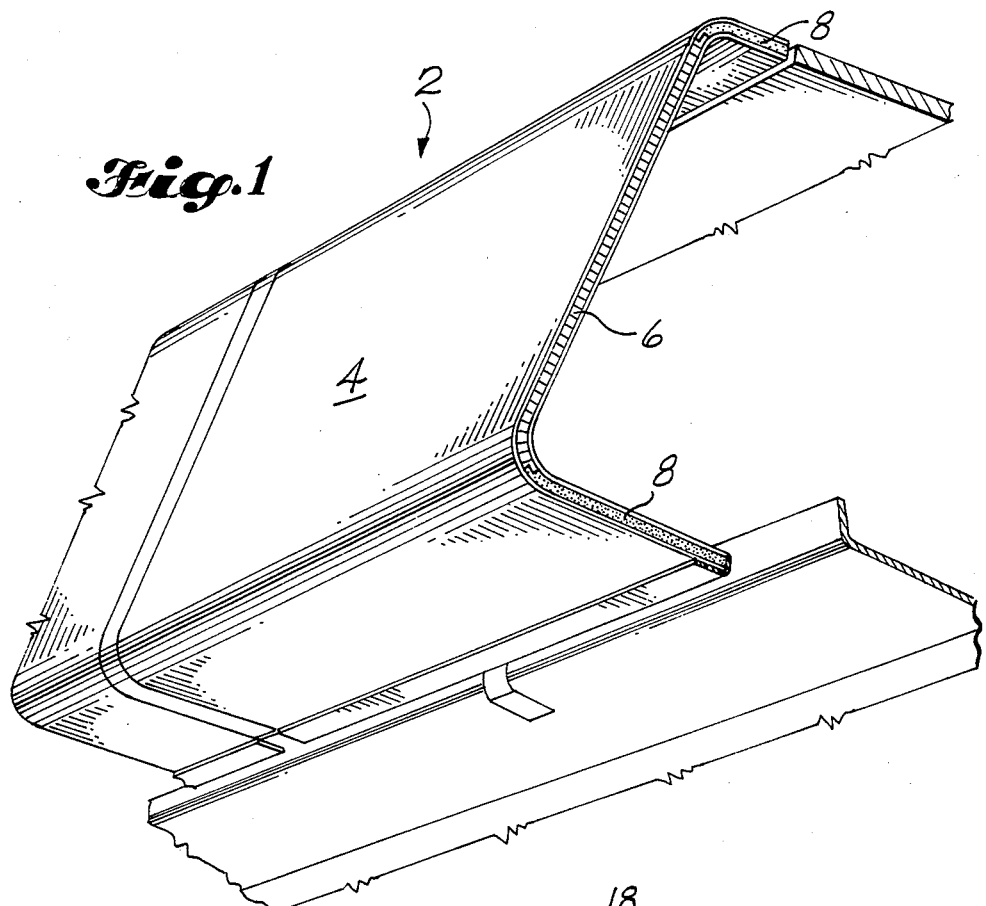
FIG. 1 is pictorial view of a section of an overhead bin of the type used in the cabins of passenger aircraft.

The drawings illustrate the best mode for carrying out the method of the invention currently known to the applicants. FIG. 1 shows a door panel 4 of a passenger cabin storage bin 2 that is constructed using the method of the invention. It is anticipated that a primary application of the invention will be in the manufacture of storage bin door panels of the type shown in FIG. 1 and fairings that are positioned above such bins. However, it is of course to be understood that the method of the invention may also be used to advantage in the fabrication of the other types of panels. It is also intended to be understood that core materials other than the honeycomb 6 and foam 8 illustrated in FIG. 1 may be used in the practice of the method of the invention.

For the purposes if comparison and of illustrating the problem solved by the method of the invention, FIGS. 8 and 9 illustrate the formation of a crushed core sandwich panel in which the interface between dissimilar core materials is formed by flat abutting faces of the materials. FIG. 8 shows an assembly of a flat section 40 of low density foam core material, a flat section 42 of honeycomb core material and an upper skin 48 and lower skin 50. The core sections 40, 42 are joined together along their planar interface 44 by an adhesive 46. FIG. 9 illustrates the assembly shown in FIG. 8 following the type of crushed core compression molding procedure described above. During the molding procedure, a bend is formed in the assembly along the interface 44. As can be seen in FIG. 9, in the finished molded panel, a gap 52 has been created between the core sections 40, 42 by separation of the sections 40, 42. In addition, the upper skin 48 has a pronounced indentation 54 along the gap 52. The gap 52 and indentation 54 will remain visible following the application of a film of decorative covering. Therefore, they must be corrected before the covering is applied in order to achieve and acceptable final appearance of the panel.

Figure 2:
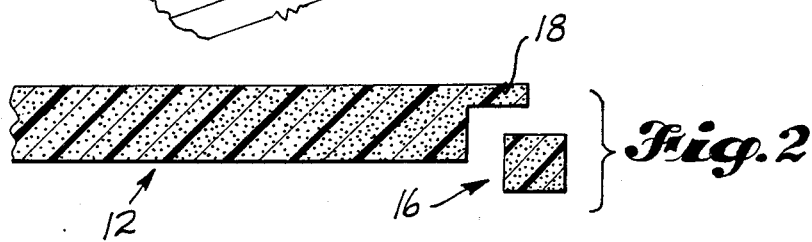
FIG. 2 is a sectional view of a piece of foam core material illustrating the formation of a flange thereon by machining the edge.

In the manufacture of a panel in accordance with the method of the invention, two flat or substantially flat sections 12, 14 of dissimilar core material are prepared and assembled together with upper and lower skins 24, 26. The preparation of the sections 12, 14 includes forming a laterally projecting flange 18 on one of the sections. The flange 18 extends integrally outwardly from an upper portion of the section and forms a reduced thickness edge of the section, as shown in FIG. 2. In the drawings, the core sections 12, 14 comprise a foam section 12 and a honeycomb section 14. Since the foam section 12 has a greater density than the honeycomb section 14, the flange 18 is formed on the foam section 12. FIG. 2 illustrates the currently preferred method for forming the flange 18. A cutout 16 is removed from the edge of the foam section 12 by machining. Alternatively, the flange 18 could be formed as part of a molding operation to form the foam section 12.

Figure 3:
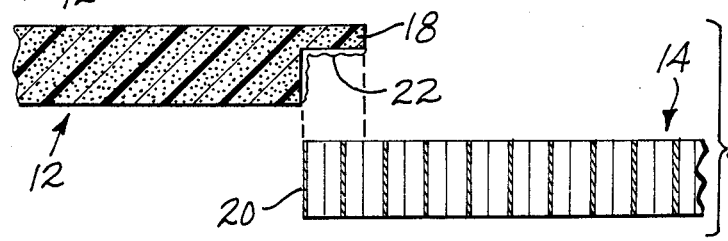
FIG. 3 is a sectional view of the machined foam with adhesive applied thereto and a section of honeycomb core material before positioning the foam and honeycomb into an abutting relationship.
Figure 4:
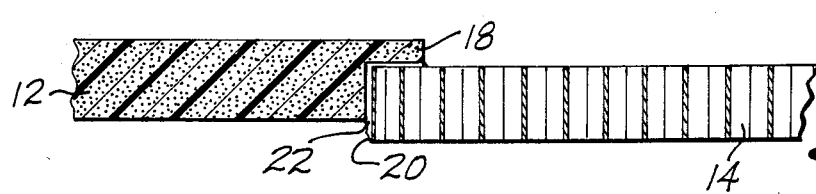
FIG. 4 is a sectional view of the members shown in FIG. 3 following positioning of the foam and honeycomb to abut each other.

FIG. 3 shows the core sections 12, 14 ready for positioning relative to each other. The honeycomb section 14 has a flat edge 20. Adhesive 22 has been applied to the inner surface of the flange 18 and the adjacent inner edge surface of the foam section 12. Preferably, the adhesive is a hot melt adhesive to maximize the ease and speed of the assembling of the core sections 12, 14. FIG. 4 shows the core sections 12, 14 following their positioning in an assembled abutting relation. The edge portion of the upper surface of the honeycomb section 14 abuts the inner surface of the flange 18, and the adjacent edge 20 of the section 14 abuts the inner edge surface of the foam section 12. The flange 18 extends over the upper surface of the honeycomb section 14. The adhesive 22 retains the sections 12, 14 in the assembled position shown in FIG. 4.

Following the joining of the sections 12, 14, the panel assembly is completed by positioning the core sections 12, 14 between an upper skin 24 and a lower skin 26, as shown in FIG. 5. The completed panel assembly is then positioned in compression molding apparatus 28, 30, FIG. 6. The molding apparatus may take various known forms which includes a lower male mold portion 28 and an upper female mold portion 30. The mold apparatus is provided with stops (not shown) to define the thickness of the cavity in which the panel assembly is molded. The stops are positioned to be slightly less than the thickness of each core section plus the thickness of the skins 24, 26. Preferably, the core sections 12, 14 have substantially the same thickness. As described above, the compression of the panel assembly in the slightly less thick cavity slightly crushes the core 12, 14 during the molding procedure. The amount of crushing is preferably so slight that it is not apparent to the naked eye in the finished panel. As noted above, this slight crushing ensures adherence of the skins 24, 26 to the core sections 12, 14 and smooth outer surfaces of the skins 24, 26 following the molding procedure. Irregularities in the outer skin surfaces that are prevented by the crushed core procedure include, for example, the formation of bubbles on the outer skin surfaces.

In most situations, the core sections 12, 14 and the skins 24, 26 are made from thermoplastic and/or thermosetting materials, and heat is applied to the panel assembly during the compression molding procedure to assist in forming of the finished panel configuration and to cure the panel elements 12, 14, 24, 26. An example of a suitable material for the foam core section 12 is divinycell foam, HT110, which is a product of Diab-Baracuda, of Grand Prairie, Texas. Divinycell foam is an alloyd linear vinyl polymer crosslinked with a urea-amide polymer. An example of a suitable honeycomb core material is nomex honeycomb. At the present time, the skins are preferably formed by one or more plies of graphite/phenolic prepreg fabric or tape. It is not desirable to form the entire core of a single foam material such as divinycell foam because of its significantly greater weight than honeycomb.

Referring to FIG. 6, it can be seen that, during the compression molding procedure, a bend 32 is formed in the panel assembly substantially along the abutting edges of the core sections 12, 14. The bend 32 increases in radius of curvature from the lower to the upper surfaces of the sections 12 14, or in other words from the lower skin 26 to the upper skin 24. As can be seen in FIG. 6, the compression molding procedure crushes the less dense of the radially adjacent portions of the core sections 12, 14, in the illustrated embodiment the adjacent portion 34 of the less dense honeycomb core section 14. Because of its greater density, the flange 18 is not noticeably crushed. As can be seen in FIGS. 6 and 7, the crushing of the honeycomb material 34 radially adjacent to the flange 18 results in an essentially voidless interface between the core sections 12, 14 sandwiched between essentially smooth portions of the skins 24, 26. The resulting final panel configuration shown in FIG. 7 has no unacceptable irregularities that would show through a decorative covering to mar its aesthetic appearance.

Following the molding and curing of the panel, the decorative covering or coating is applied. Preferably, the covering is applied in the form of a polyvinylfluoride film of the type sold by Dupont under the trademark Tedlar. The Tedlar film is vacuum formed over the upper skin 24 of the molded panel assembly in a known manner. A vacuum is used to pull the film down onto the upper skin 24, and heat is applied in an infrared oven. A Tedlar film may also be applied to the outer surface of the lower skin 26 in the same manner. Alternatively, for uses such as the storage bin door panel 4 shown in FIG. 1, the lower film may be applied during the compression molding procedure. This does not result in as high a quality finished appearance as the separate covering procedure. However, the results are usually acceptable for the inside surface of an element like a bin door panel 4. The covering is manually wrapped around all four foam edges of the panel and extended over the adjacent surfaces for a distance of about one inch. The edge wrappings are formed and secured using an adhesive and a heat gun.

It will be obvious to those skilled in the art to which this invention is addressed that the invention may be used to advantage in a variety of situations. Therefore, it is intended to be understood by those skilled in the art that various modifications and omissions in form and detail may be made without departing from the spirit and scope of the invention as defined by the following claims.

What is claimed is:

1. A method of making panels of the type having a low density core sandwiched between outer skins and an interface between two different core materials along a radius of the panel, said method comprising:
   providing a substantially flat section of each said core material.
   forming a flange that extends integrally outwardly from an upper portion of one of said sections and forms a reduced thickness edge on said one section;
   positioning said one section to abut an edge of the other of said sections with said flange extending over the upper surface of said other section;
   assembling the abutting sections and two skins, including positioning the abutting sections between the skins;
   compression molding the assembled sections and skins to form a panel with a bend substantially along the abutting edges of said sections, said bend increasing in radius of curvature from the lower to the upper surfaces of said sections; and
   while so molding said sections and skins, crushing at least one of said flange and the radially adjacent portion of said other section to form an essentially voidless interface between said sections sandwiched between essentially smooth portions of said skins.

2. The method of claim 1, in which said core materials comprise a low density foam and a honeycomb material.

3. The method of claim 1, in which said sections comprise a first section with a first density, and a second section with a second density less than said first density; and said flange is formed on said first section.

4. The method of claim 3, in which said first section comprises a low density foam, and said second section comprises a honeycomb material.

5. The method of claim 1, in which the step of positioning said one section to abut an edge of said other section comprises applying an adhesive between said sections to maintain them in an abutting relation.

6. The method of claim 2, in which the step of positioning said one section to abut an edge of said other section comprises applying an adhesive between said sections to maintain them in an abutting relation.

7. The method of claim 4, in which the step of positioning said one section to abut an edge of said other section comprises applying an adhesive between said sections to maintain them in an abutting relation.

8. The method of claim 1, in which the step of forming said flange comprises machining said one section.

9. The method of claim 2, in which the step of forming said flange comprises machining said foam.

10. The method of claim 1, in which the step of compression molding said sections and skins comprises allowing substantially the entire extend of each said section to be crushed an amount sufficient to ensure bonding of the skins to said sections and to produce substantially smooth outer skin surfaces.

11. The method of claim 2, in which the step of compression molding said sections and skins comprises allowing substantially the entire extent of each said section to be crushed an amount sufficient to ensure bonding of the skins to said sections and to produce substantially smooth outer skin surfaces.

12. The method of claim 3, in which the step of compression molding said sections and skins comprises allowing substantially the entire extent of each said section to be crushed an amount sufficient to ensure bonding of the skins to said sections and to produce substantially smooth outer skin surfaces.

13. The method of claim 4, in which the step of compression molding said sections and skins comprises allowing substantially the entire of each said section to be crushed an amount sufficient to ensure bonding of the skins to said sections and to produce substantially smooth outer skin surfaces.

14. The method of claim 6, in which the step of compression molding said sections and skins comprises allowing substantially the entire extent of each said section to be crushed an amount sufficient to ensure bonding of the skins to said sections and to produce substantially smooth outer skin surfaces.

15. The method of claim 7, in which the step of compression molding said sections and skins comprises allowing substantially the entire extent of each said section to be crushed an amount sufficient to ensure bonding of the skins to said sections and to produce substantially smooth outer skin surfaces.

* * * * *

UNITED STATES PATENT AND TRADEMARK OFFICE
CERTIFICATE OF CORRECTION

PATENT NO. : 4,917,747

DATED : April 17, 1990

INVENTOR(S) : Victor C. Chin, Paul Y. Jone and Robert J. Marshall

It is certified that error appears in the above-identified patent and that said Letters Patent is hereby corrected as shown below:

Column 1, line 35, "desirable" should be -- desirably --.

Column 2, line 36, "disclosed" should be -- disclose --.

Column 2, line 58, "4,325,050" should be -- 4,315,050 --.

Column 5, line 31, "and" should be -- an --.

Column 6, line 46, "12 14," should be -- 12, 14, --.

Claim 1, column 7, line 29, "material." should be

-- material; --

Claim 10, column 8, line 22, "extend" should be -- extent --.

Claim 13, column 8, line 40, after "entire", insert -- extent --.

Signed and Sealed this

First Day of October, 1991

Attest:

HARRY F. MANBECK, JR.

Attesting Officer    Commissioner of Patents and Trademarks